(12) United States Patent
Olsen et al.

(10) Patent No.: US 8,458,770 B2
(45) Date of Patent: Jun. 4, 2013

(54) APPLICATION CONTEXT BASED ACCESS CONTROL

(75) Inventors: Geir Olsen, Wayzata, MN (US); Lee C. Spiesman, Fargo, ND (US); Michael D. Smith, Horace, ND (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/232,541

(22) Filed: Sep. 14, 2011

(65) Prior Publication Data

US 2012/0005722 A1    Jan. 5, 2012

Related U.S. Application Data

(63) Continuation of application No. 11/312,828, filed on Dec. 20, 2005.

(51) Int. Cl.
*G06F 21/00* (2006.01)

(52) U.S. Cl.
USPC .............. 726/2; 726/27; 713/155; 713/156; 713/157; 713/158; 713/159

(58) Field of Classification Search
USPC .......................................................... 726/2–5
See application file for complete search history.

(56) References Cited

U.S. PATENT DOCUMENTS

| | | | |
|---|---|---|---|
| 5,903,720 A | 5/1999 | Stokes | |
| 6,195,685 B1 | 2/2001 | Mukherjee et al. | |
| 6,308,273 B1 | 10/2001 | Goertzel et al. | |
| 6,377,994 B1 | 4/2002 | Ault et al. | |
| 6,715,077 B1 | 3/2004 | Vasudevan et al. | |
| 7,231,661 B1 | 6/2007 | Villavicencio et al. | |
| 2002/0004909 A1 | 1/2002 | Hirano et al. | |

(Continued)

FOREIGN PATENT DOCUMENTS

| EP | 1378813 | 7/2004 |
|---|---|---|
| WO | WO2005/076726 | 8/2005 |
| WO | WO2005/096147 | 10/2005 |

OTHER PUBLICATIONS

"Context-Based Security Policies: A New Modeling Approach" by Brezillon, Patrick and Mostefaoui, Ghita Kouadri. Proceedings of the Second IEEE Annual Conference on Pervasive Computing and Communications Workshops (PERCOMW' 04) 0-7695-2106-1/04 (c) 2004 IEEE.

(Continued)

*Primary Examiner* — Ghazal Shehni
(74) *Attorney, Agent, or Firm* — Westman, Champlin & Kelly, P.A.

(57) ABSTRACT

Access control for an application is described. An exemplary method includes receiving a first command of an application to invoke a function of a user interface, identifying a first authorization context based on a first user context and the function of the user interface invoked, retrieving a first access policy providing access criteria associated with the first authorization context, and applying the first access policy to the accessibility of the function. The method includes receiving a second command to invoke the function in a second instance of the application and identifying a second authorization context based on a second user context and the function of the user interface invoked. The second authorization context is different than the first authorization context. The method includes retrieving a second access policy providing second access criteria associated with the second authorization context and applying the second access policy to the accessibility of the function.

20 Claims, 7 Drawing Sheets

U.S. PATENT DOCUMENTS

| | | | |
|---|---|---|---|
| 2002/0166052 | A1 | 11/2002 | Garg et al. |
| 2002/0188869 | A1 | 12/2002 | Patrick |
| 2003/0076955 | A1 | 4/2003 | Alve et al. |
| 2003/0084331 | A1 | 5/2003 | Dixon et al. |
| 2003/0084350 | A1* | 5/2003 | Eibach et al. ............. 713/201 |
| 2003/0225697 | A1 | 12/2003 | DeTreville |
| 2004/0039691 | A1* | 2/2004 | Barratt et al. .............. 705/39 |
| 2004/0250107 | A1 | 12/2004 | Guo |
| 2005/0055578 | A1 | 3/2005 | Wright et al. |
| 2005/0182958 | A1 | 8/2005 | Pham et al. |
| 2007/0133806 | A1 | 6/2007 | Asano |
| 2007/0143823 | A1 | 6/2007 | Olsen |

OTHER PUBLICATIONS

"Context-Based Secure Resource Access in Pervasive Computing Environments" by Anand Tripathi, Tanvir Ahmed, Devdatta Kulkarni, Richa Kumar, and Komal Kashiramka. Department of Computer Science, University of Minnesota, Minneapolis, MN 55455, prior to Oct. 21, 2005.

"A Role and Context-Based Security Model" by Yolanta Beresnevichiene. University of Cambridge, Computer Laboratory, Jan. 2003. pp. 1-89.

"Context-Based Security Management for Multi-Agent Systems" by Rebecca Montanari, Alessandra Toninelli and Jeffrey M. Bradshaw. Dipartimento di Elettronica, Informatica e Sistemistica (DEIS), University of Bologna and Institute for Human and Machine Cognition (IHMC), prior to Oct. 21, 2005.

"A Generic Framework for Context-Based Distributed Authorizations", by Ghita Kouadri, Mostefaoui and Patrick Brezillon. P. Blackburn et al. (Eds.): CONTEXT 2003, LNAI 2680, pp. 204-217, 2003. (c) Springer Verlag Berlin Heidelberg 2003.

Sygate Secure Enterprise—http://www.sygate.com/products/sygate-secure-enterprise.htm. Sygate Acquired by Symantec. Oct. 21, 2005.

Prosecution History fpatent application No. U.S 2007/0143823: Office Action mailed on May 5, 2009; Amendment filed on Aug. 5, 2009; Final Office Action mailed on Dec. 15, 2009; Amendment filed with RCE on Mar. 11, 2010; Office Action mailed on Apr. 7, 2010; Amendment filed on Jul. 1, 2010; Final Office Action mailed on Sep. 7, 2010; Amendment filed with RCE on Nov. 10, 2010; Office Action filed on Jan. 24, 2011; Amendment filed on Apr. 18, 2011; Notice of Allowance filed on Jul. 13, 2011; Issue Notification filed on Sep. 28, 2011.

* cited by examiner

APPLICATION CONTEXT BASED ACCESS CONTROL

CROSS-REFERENCE TO RELATED APPLICATION

The present application is a continuation of and claims priority of U.S. patent application Ser. No. 11/312,828, filed Dec. 20, 2005, the content of which is hereby incorporated by reference in its entirety.

BACKGROUND

Many users can access business or other information through applications over a local or wide area network. Some information generated by an application contain sensitive information, such as payroll data or credit information. Other information is general. Businesses or other organizations want to limit access to sensitive information, such as credit information or payroll information to a select group of users, yet provide unrestricted access to general information.

Effective security would grant access to information based upon application of one or more criteria, such as time of day, location, task and the role of the user in relation to the information requested. Systems that control access based upon a user's function or role are not sensitive to the functions or information structure of the application program. Access control applied directly on the object is not sensitive to the functional context (task) in which the access happens. Discretionary Access lists control access to files and directories based upon an authorized user list. Once the right is granted, the right typically applies regardless of the task or function activated by the user.

The discussion above is merely provided for general background information and is not intended to be used as an aid in determining the scope of the claimed subject matter.

SUMMARY

Access control for an application is described. In one exemplary embodiment, a method is provided and includes receiving a first command of an application to invoke a function of a user interface, identifying, using a computer processor, a first authorization context based on a first user context and the function of the user interface invoked, retrieving a first access policy providing access criteria associated with the first authorization context, and applying the first access policy to the accessibility of the function. The method also includes receiving a second command to invoke the function in a second instance of the application and identifying a second authorization context based on a second user context and the function of the user interface invoked. The second authorization context is different than the first authorization context. The method also includes retrieving a second access policy providing second access criteria associated with the second authorization context and applying the second access policy to the accessibility of the function.

In another exemplary embodiment, a method is provided and includes receiving a first command through a user interface to invoke a first function of an application, identifying a first authorization context associated with the first function of the application, retrieving a first access policy providing access criteria associated with the first authorization context, and applying the first access policy to accessibility of the first function using a computer processor. The method also includes receiving a second command to invoke a second function of the application that is different than the first function of the application, identifying a second authorization context associated with the second function of the application, retrieving a second access policy providing second access criteria associated with the second authorization context, and applying the second access policy to accessibility of the second function.

In another exemplary embodiment, a computer readable storage medium storing executable instructions is provided. The instructions, when executed using a processor, perform a method including receiving a command through a user interface to invoke a function selected from a plurality of different functions within an application and identifying, using the processor, an authorization context based on a user context and the selected function that is invoked. The method also includes retrieving an access policy providing access criteria associated with the authorization context, and applying the access policy to the selected function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
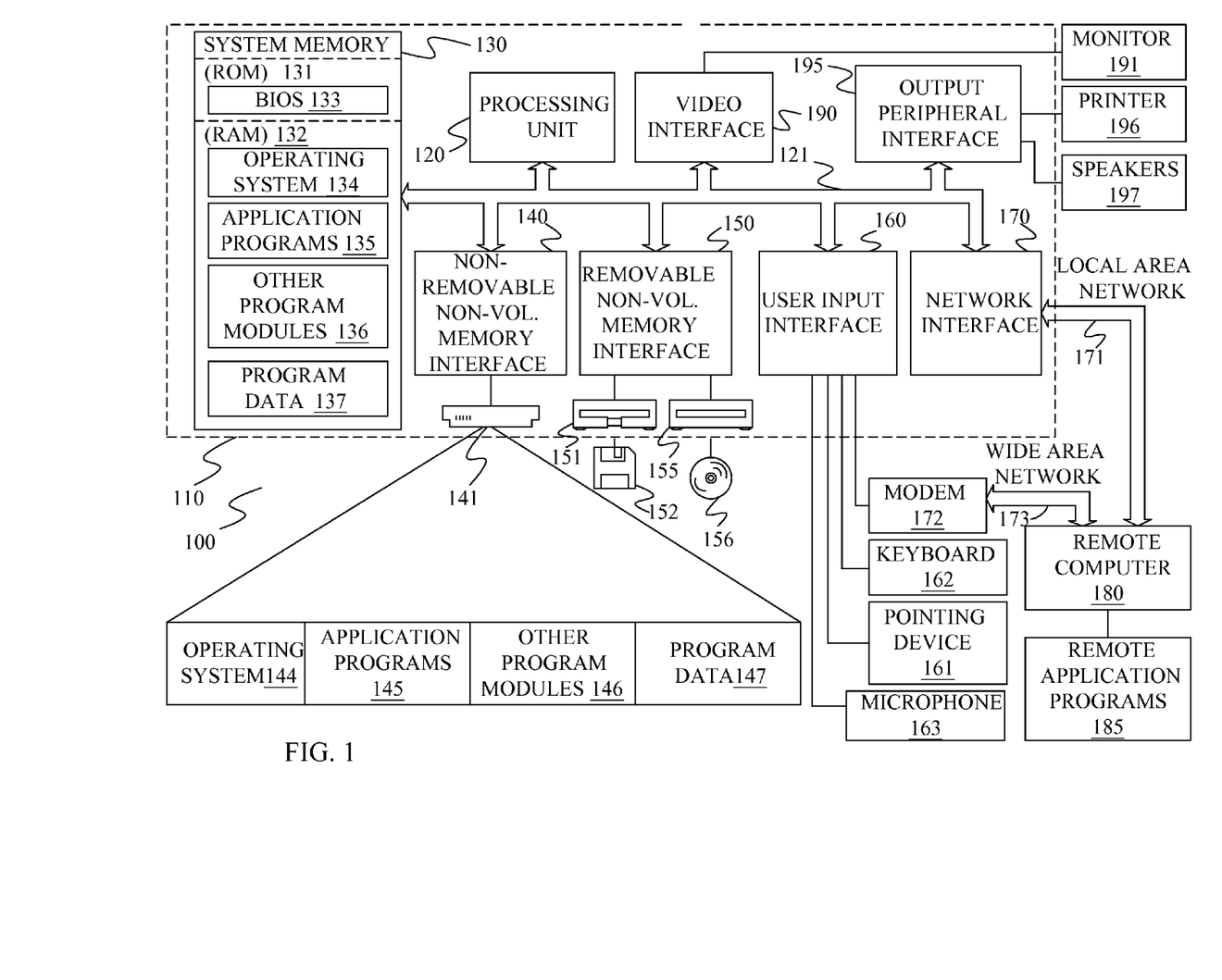
FIG. 1 is a diagram of one illustrative embodiment of a computing environment in which embodiments of access control using authorization contexts can be applied.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purposes or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
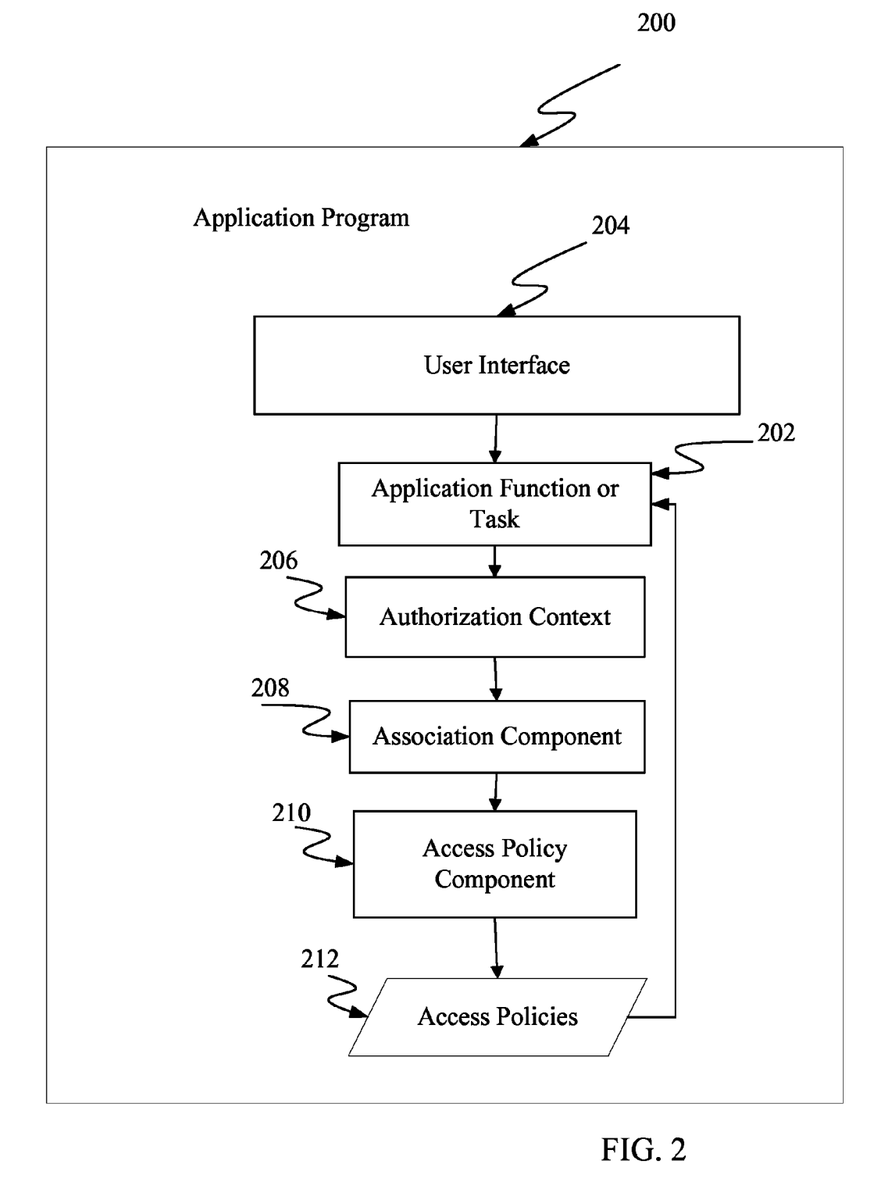
FIG. 2 is a block diagram illustrating an embodiment of an application including an access policy module to invoke one or more access policies based upon an authorization context.

FIG. 2 illustrates an embodiment of an application program 200 that operates in the computer environment of FIG. 1. Illustratively, the application program includes one or more application functions or tasks 202 that are invoked through a user interface 204 to access information or application directories of the application. The application 200 includes one or more authorization contexts 206 associated with the application function or task 202 which are activated in response to selection of the function or task 202.

Also as shown, the application includes an association component 208 and an access policy component 210. The association component 208 is configured to associate the active authorization context 206 with one or more access policies 212. The associated access policies are invoked through the access policy component 210. The invoked access policies 212 provides rules governing access to information and tasks while the authorization context 206 is active.

Figure 3:
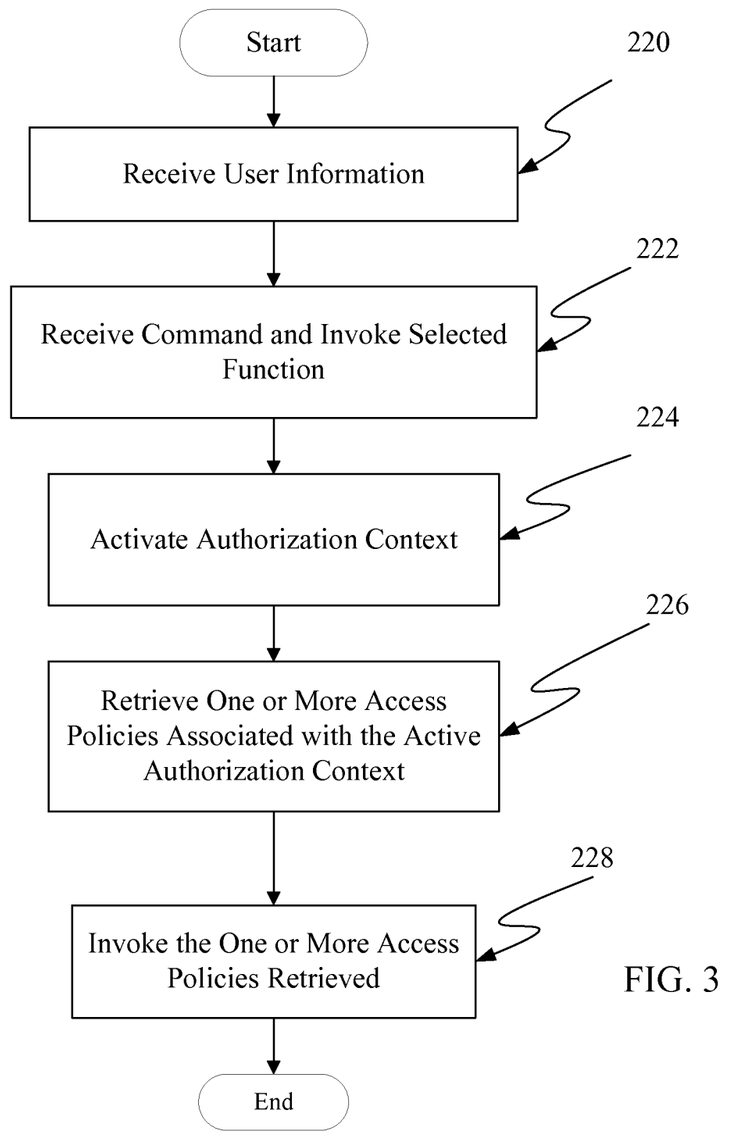
FIG. 3 is a flow chart illustrating steps to invoke one or more access policies based upon an authorization context.

FIG. 3 illustrates process steps for implementing authorization context based access as described in FIG. 2. In steps 220, the application receives user information, such as user identification, location and time. The user information can be received in response to a "log-on" prompt or other user identification or features. As shown in step 222, the application receives a command and invokes a user selected function. In step 224, the application activates an authorization context based upon the user information and/or the function invoked in step 222. It is important to note that the user information, time of day information etc. is not required, and in illustrative embodiments, the application can activate authorization contexts solely on the basis of the function or task that is being executed. In step 226, the application retrieves one or more access policies associated with the active authorization context 206 and in step 228 the application invokes the one or more access policies associated with the active authorization context 206.

For example, following a log-on process the application, may invoke one or more access policies for a main authorization context based upon a user role or function. From the main function or node, a user may invoke a "Browse Customer Directory" function in a business application example. Once the "Browse Customer Directory" function is invoked, the application activates a "Browse Customer Directory authorization context". One or more access policies associated with the "Browse Customer Directory authorization context" are invoked to control access to information or tasks through the "Browse Customer Directory Function" based upon the user's function or role.

The application context based access described in FIGS. 2-3 can be incorporated into a variety of applications using application or programming tools 229. The tools for example, include the framework to generate different object orientated programming modules, code, data or metadata to create the application framework to implement the access control described.

Figure 4:
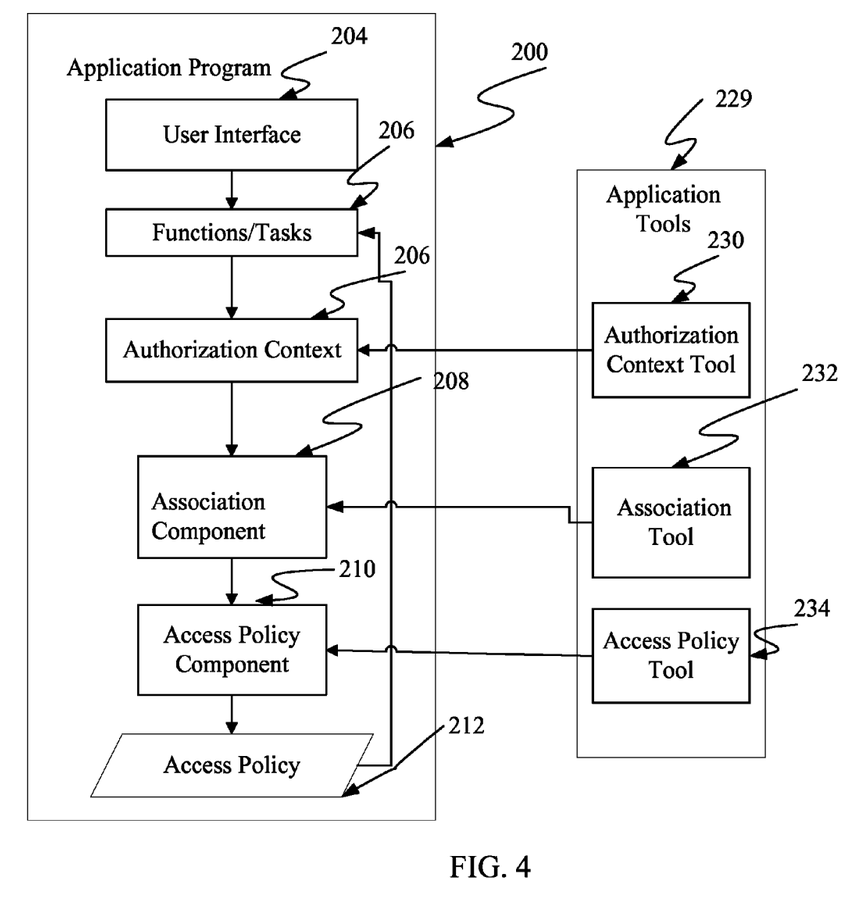
FIG. 4 is a block diagram illustrating an embodiment for creating a set of authorization contexts for an application program.

The tools in the embodiment illustrated in FIG. 4 include an authorization context tool 230. The authorization context tool 230 is configured to create a hierarchical authorization context framework for functions, tasks or other function or security boundaries of the application program. For example, in an illustrated embodiment, a banking application can have one or more teller functions and an authorization context can be defined relative to the one or more teller functions or other security or functional boundary of the application. Access to the teller functions of the authorization context is controlled based upon rules defined in the access policies to limit access to information or tasks of the application.

Other tools include an association tool 232 to generate the association component 208 and access policy tool 234 to generate the access policy component 210 to invoke one or more access policies based upon the active authorization context 206.

Figure 5:
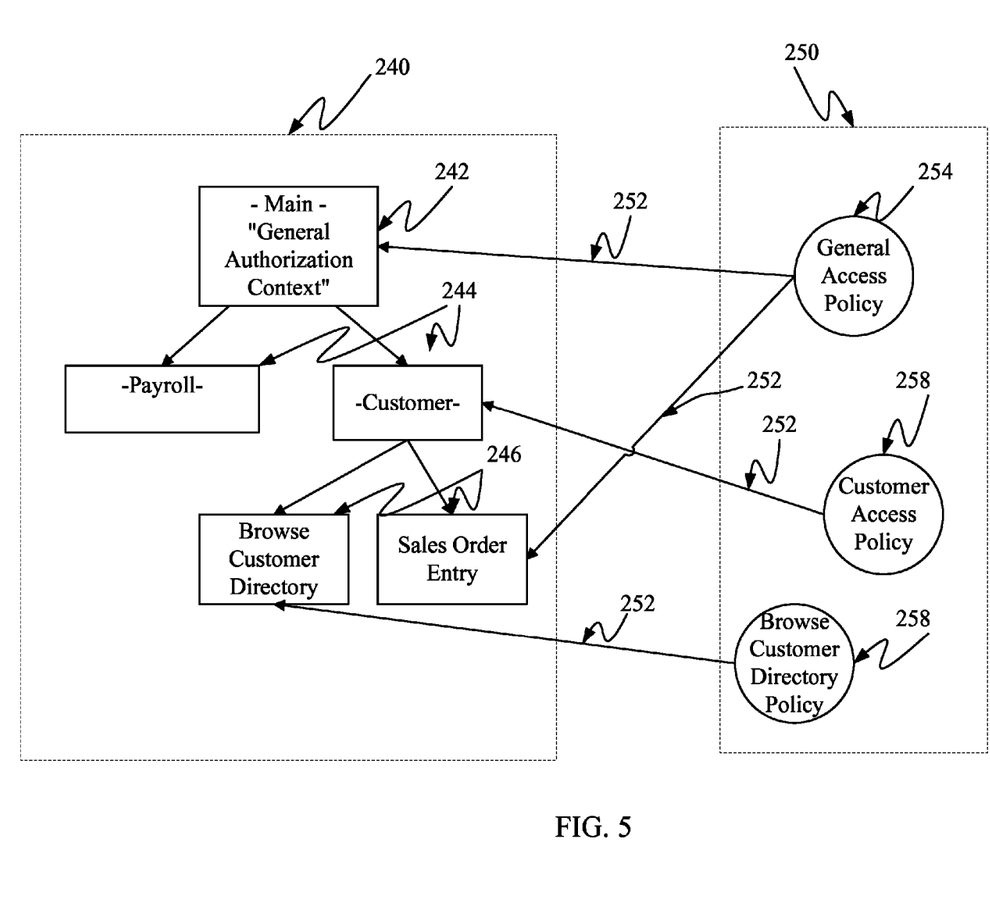
FIG. 5 is a block diagram illustrating a hierarchical structure for authorization contexts generated from an application tool.

FIG. 5 illustrates an embodiment of a hierarchical authorization context framework. The framework creates a set of authorization contexts 240 for hierarchical nodes of the application program. In the embodiment shown, the hierarchical nodes includes a main or base node 242 and a plurality of dependent nodes 244 and 246 that represent functions or task that are invoked through the main or base node.

In the illustrated embodiment for a business application, the dependent nodes 244 include "Payroll" and "Customer" functions which are invoked through the main or base node 242 and nodes 246 include "Browse Customer Directory" and "Sales Order Entry" functions which are invoked through the "Customer" node. The set of authorization contexts generated by tool 230 for the application nodes of FIG. 5 include an "General Authorization Context" "Payroll authorization context", "Customer Authorization context", "Browse customer directory authorization context" and "Sales order entry authorization context".

The authorization context framework generated by the tool 230 can have varied degrees of complexity depending upon the level of security or access control desired. In the illustrated embodiment, once created the set of authorization contexts 240 is not modifiable or edible through the application program 200.

As shown in FIG. 5, the application invokes one or more access policies from a set of access policies 250. Access policies in the set of access policies 250 are invoked through associations defined in the association component 208 as illustrated by lines 252 in FIG. 5. In illustrated embodiment, the set of access policies 250 includes "General Access Policy" 254, "Customer Access Policy" 256, and "Browse Customer Directory Access Policy" 258. The "General Access Policy" 256 is associated with the "General Authorization Context" and "Sale Order Entry Authorization Context". The "Customer Access Policy" 256 is associated with the "Customer Authorization Context" and the "Browse Customer Directory Access Policy" 258 is associated with the "Browse Customer Directory Authorization Context".

Access policies of the set of access policies 250 include one or more rules that control access to information or tasks for the authorization context. The access policies 250 can also include rules relating to whether or when a user may execute certain functions, delegate responsibilities to other users or print reports as well as rules defining access or task boundaries. For example, depending upon the authorization context 206, the policy rules can restrict access to portions of information or can grant "read-only" access to the user based upon the role of the user and the function or task the user is performing in that role. Thus, a particular user can have access to information while performing one task but not while performing another. For example in the embodiment illustrated in FIG. 5, the "Browse Customer Directory Access Policy" 258 restricts access to certain records or information based upon the user's role and/or the function performed.

Figure 6:
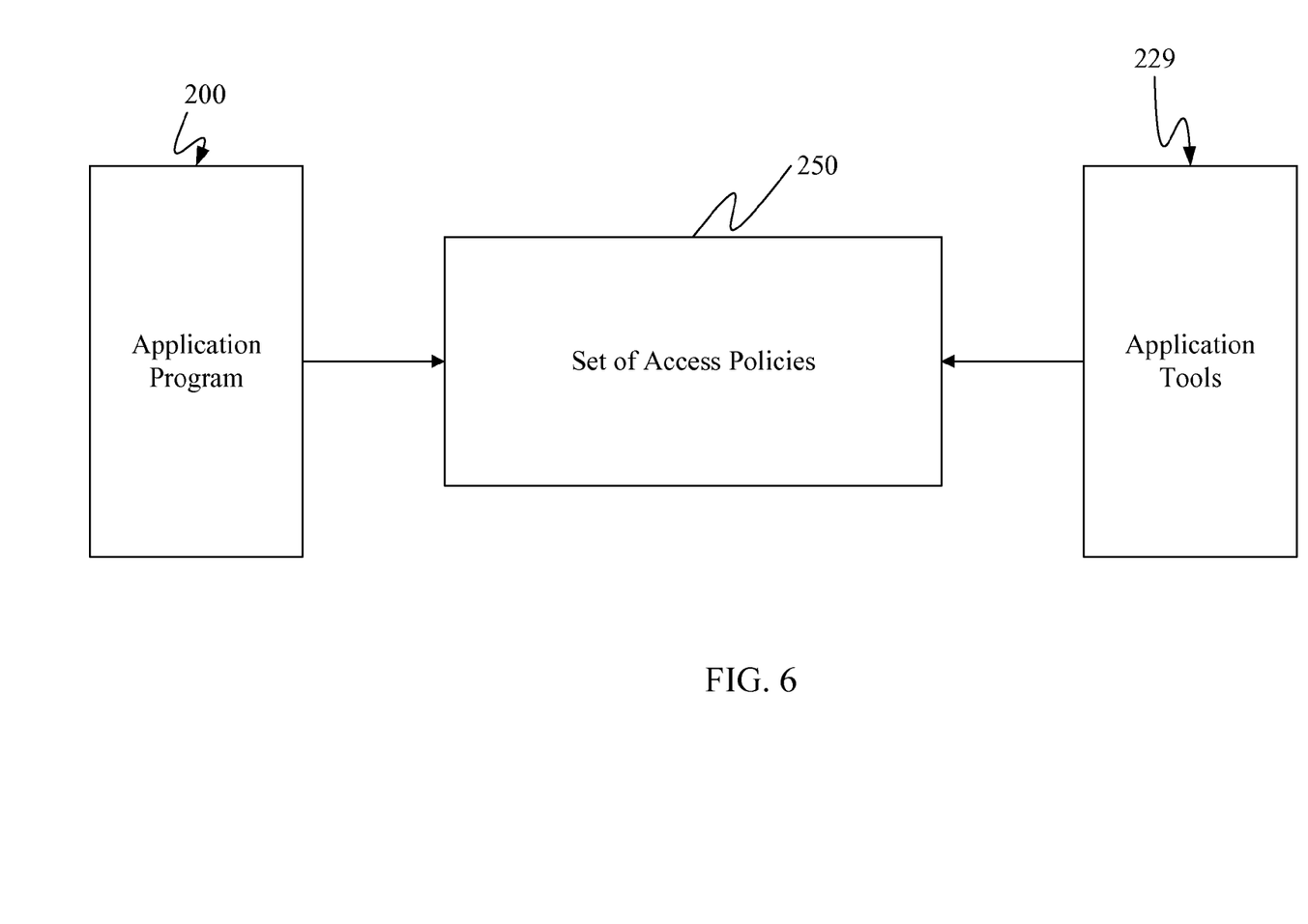
FIG. 6 is a block diagram illustrating creation of a set of one or more access policies through an application program or tool.

As shown in FIG. 6, the set of access policies and rules illustrated in FIG. 5 can be defined or created through the application program 200 or through application tools 229 based upon the criteria or structure of the application. The set of access policies and rules can be generated from a collection of form access policies or generated from custom policies created by a developer or administrator. The application can use a static set of access policies and policy rules or the application can include a set of access policy that can be modified or edited through a security administration console of the application program.

The associations implemented by the association component 208 can likewise defined through the application program 200 or application tools 229.

Figure 7:
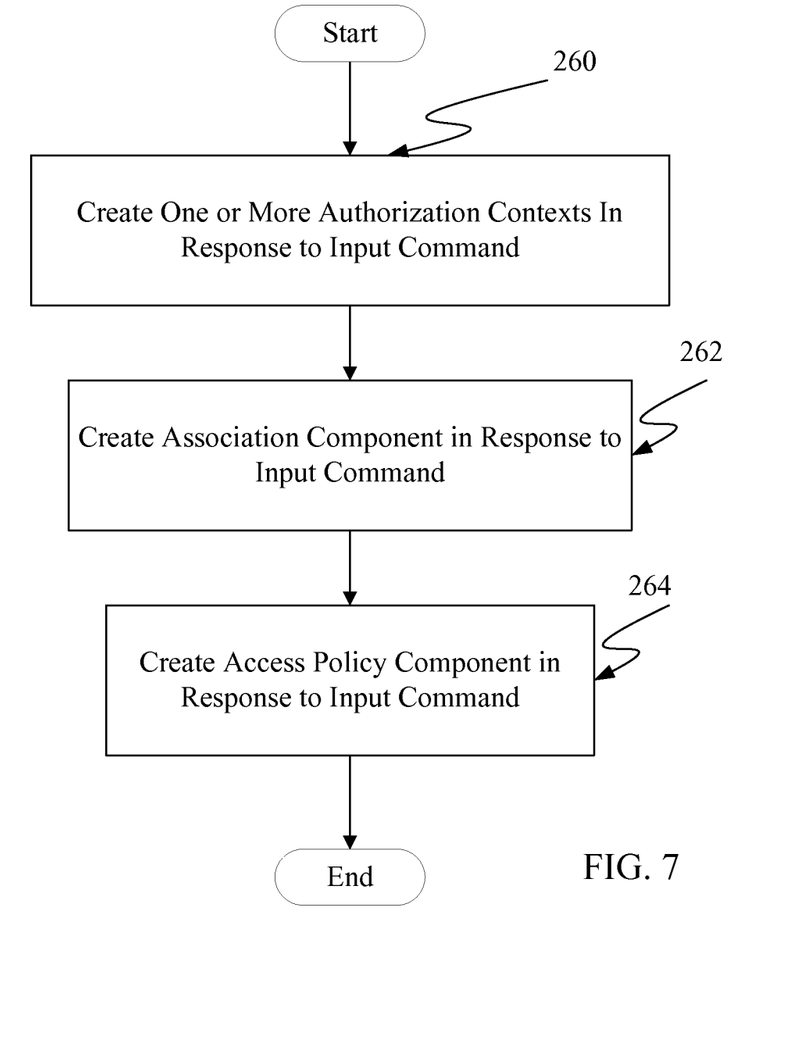
FIG. 7 is a flow chart illustrating steps for generating a set of authorization contexts which are used to invoke one or more access policies.

FIG. 7 is a flow chart illustrating steps for creating a set of authorization contexts 240 to invoke one or more access policies as previously described. As shown in step 260, a set of one or more authorization contexts is created in response to receipt of an input command. In step 262, an association component is created to associate one or more access policies from a set of access policies 250 to the authorization contexts 206 in response to receipt of an input command. In step 264, the access policy component 210 is created to invoke one or more access policies in response to receipt of an input command. As described, in illustrated embodiments, the set of authorization contexts 240 is developed based upon the hierarchical structure or boundaries of the application program to provide context sensitive access policies for different application functions or tasks based upon the user's role and/or function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the present invention has been described with reference to preferred embodiments, workers skilled in the art will recognize that changes may be made in form and detail without departing from the spirit and scope of the invention.

What is claimed is:

1. A method comprising:
    receiving a first command of an application to invoke a function of a user interface;
    identifying, using a computer processor, a first authorization context based on a first user context and the function of the user interface invoked;
    applying access criteria associated with the first authorization context to provide user access to a first portion of application data;
    receiving a second command to invoke the function in a second instance of the application;
    identifying a second authorization context based on a second user context and the function of the user interface invoked; and
    applying access criteria associated with the second authorization context to provide user access to a second portion of the application data and restrict access to the first portion of application data.

2. The method of claim 1, wherein the function is selected from a plurality of functions and the first and second authorization contexts are identified based on user criteria and which function of the plurality of functions is selected.

3. The method of claim 1, wherein the first authorization context is identified based on a first location of the user, and the second authorization context is identified based on a second location of the user.

4. The method of claim 1, wherein the first authorization context is associated with a first time of day.

5. The method of claim 4, wherein the second authorization context is associated with a second time of day.

6. The method of claim 1, wherein applying access criteria associated with the first authorization context comprises providing a first level of access to the application data.

7. The method of claim 6, wherein applying access criteria associated with the second authorization context comprises providing a second level of access to the application data.

8. The method of claim 1, wherein applying access criteria associated with the second authorization context comprises restricting the user to read only access of the first portion of the application data.

9. The method of claim 8, wherein applying access criteria associated with the first authorization context comprises allowing the user to modify the first portion of the application data.

10. The method of claim 1, wherein the function corresponds to at least one of:
    a payroll function;
    a customer function; and
    a sales order function.

11. A method of providing access to application data, the method comprising:
    receiving a first command through a user interface to invoke a data access function of an application;
    identifying a first authorization context associated with the data access function invoked by the first command;
    retrieving a first access policy providing access criteria associated with the first authorization context;
    applying the first access policy to provide a first level of access to the application data using a computer processor;
    receiving a second command to invoke a data access function of the application;
    identifying a second authorization context associated with the data access function invoked by the second command;
    retrieving a second access policy providing second access criteria associated with the second authorization context; and
    applying the second access policy to provide a second level of access to the application data.

12. The method of claim 11, wherein applying the first access policy comprises:
    allowing user access to a first portion of the application data and restricting user access to a second portion of the application data.

13. The method of claim 12, wherein applying the second access policy comprises:
    allowing user access to the second portion of the application data.

14. The method of claim 11, wherein applying the first access policy comprises:
    providing read-only access to at least a portion of the application data.

15. The method of claim 14, wherein applying the second access policy comprises:

allowing user modification of the portion of the application data.

16. The method of claim 11, wherein the first and second commands invoke the same data access function.

17. A hardware computer readable storage medium storing executable instructions which, when executed using a processor, perform a method comprising:
    displaying a user interface of an application having a plurality of different data access functions selectable through the user interface;
    receiving a user input command through the user interface to invoke a function selected from the plurality of different data access functions;
    identifying, using the processor, an authorization context based on a user context and the selected function that is invoked;
    retrieving an access policy providing access criteria associated with the authorization context; and
    applying the access policy to the selected function to control user access to data in the application.

18. The hardware computer readable storage medium of claim 17, wherein the method comprises:
    receiving a second command to invoke a second function selected from the plurality of different functions within the application;
    identifying a second authorization context based on a second user context and the selected second function that is invoked, the second authorization context being different than the first authorization context;
    retrieving a second access policy providing second access criteria associated with the second authorization context; and
    applying the second access policy to the selected second function.

19. The hardware computer readable storage medium of claim 18, wherein applying the access policy comprises allowing access by the user to particular information associated with the application and wherein applying the second access policy comprises denying access by the user to the particular information.

20. The hardware computer readable storage medium of claim 18, wherein a plurality of different authorization contexts are associated with the plurality of different functions within the application.

* * * * *